United States Patent [19]
Kramer

[11] 3,908,661
[45] Sept. 30, 1975

[54] SURGICAL INSTRUMENTS

[76] Inventor: Steven G. Kramer, 355 Serrano Dr., San Francisco, Calif. 94132

[22] Filed: Jan. 31, 1974

[21] Appl. No.: 438,211

[52] U.S. Cl. ............................................. 128/305
[51] Int. Cl.² .......................................... A61B 17/32
[58] Field of Search ...................... 128/303 R, 305

[56] References Cited
UNITED STATES PATENTS

| | | | |
|---|---|---|---|
| 1,275,520 | 8/1918 | Bell | 128/303 R X |
| 1,761,761 | 6/1930 | Vicente | 128/303 R |
| 2,555,076 | 5/1951 | Crossley | 128/303 R |
| 3,528,425 | 9/1970 | Banko | 128/305 R |
| 3,589,363 | 6/1971 | Banko et al. | 128/276 |
| 3,736,938 | 6/1973 | Evvard et al. | 128/305 R |
| 3,809,092 | 5/1974 | Abraham | 128/305 |
| 3,809,093 | 5/1974 | Abraham | 128/305 R |

*Primary Examiner*—Channing L. Pace
*Attorney, Agent, or Firm*—Root & O'Keeffe

[57] ABSTRACT

A surgical instrument for capturing and fragmenting lens material in an eye, during extracapsular cataract surgery.

21 Claims, 13 Drawing Figures

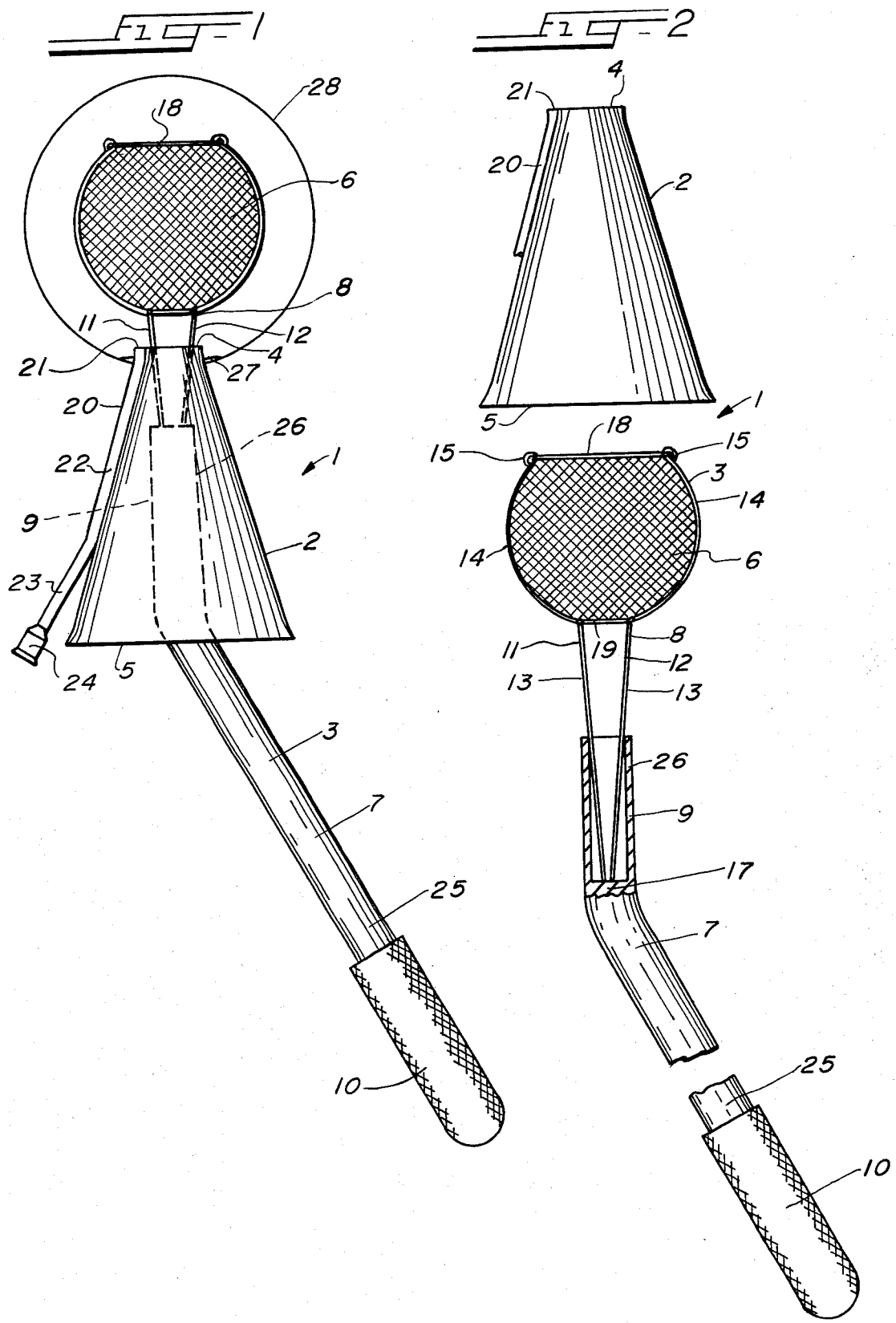

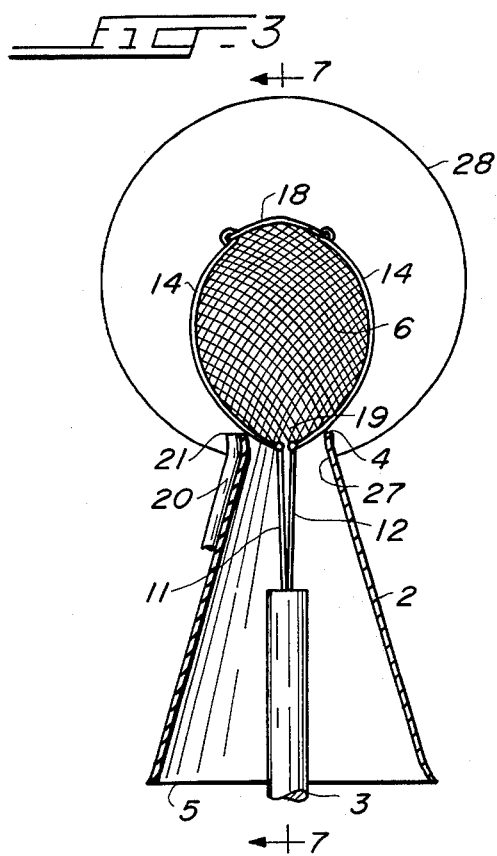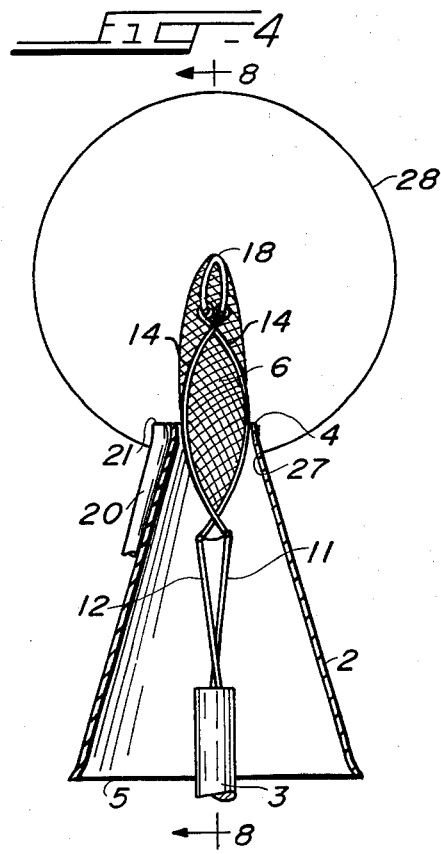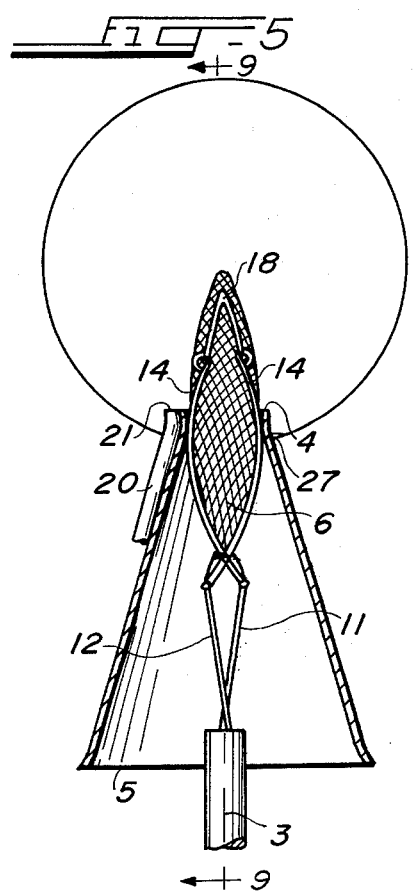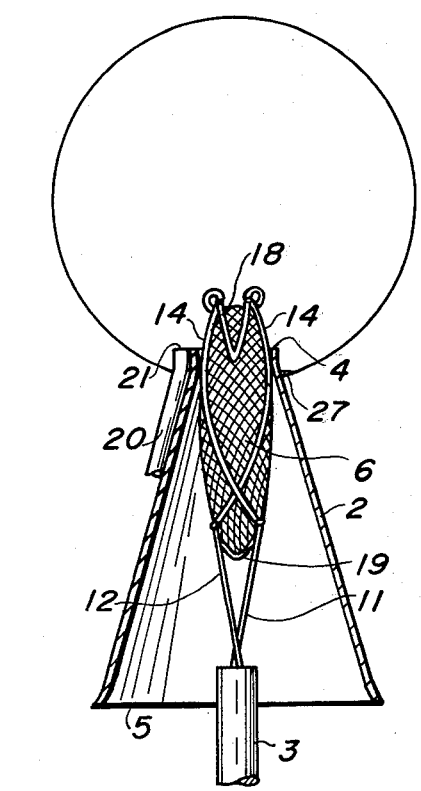

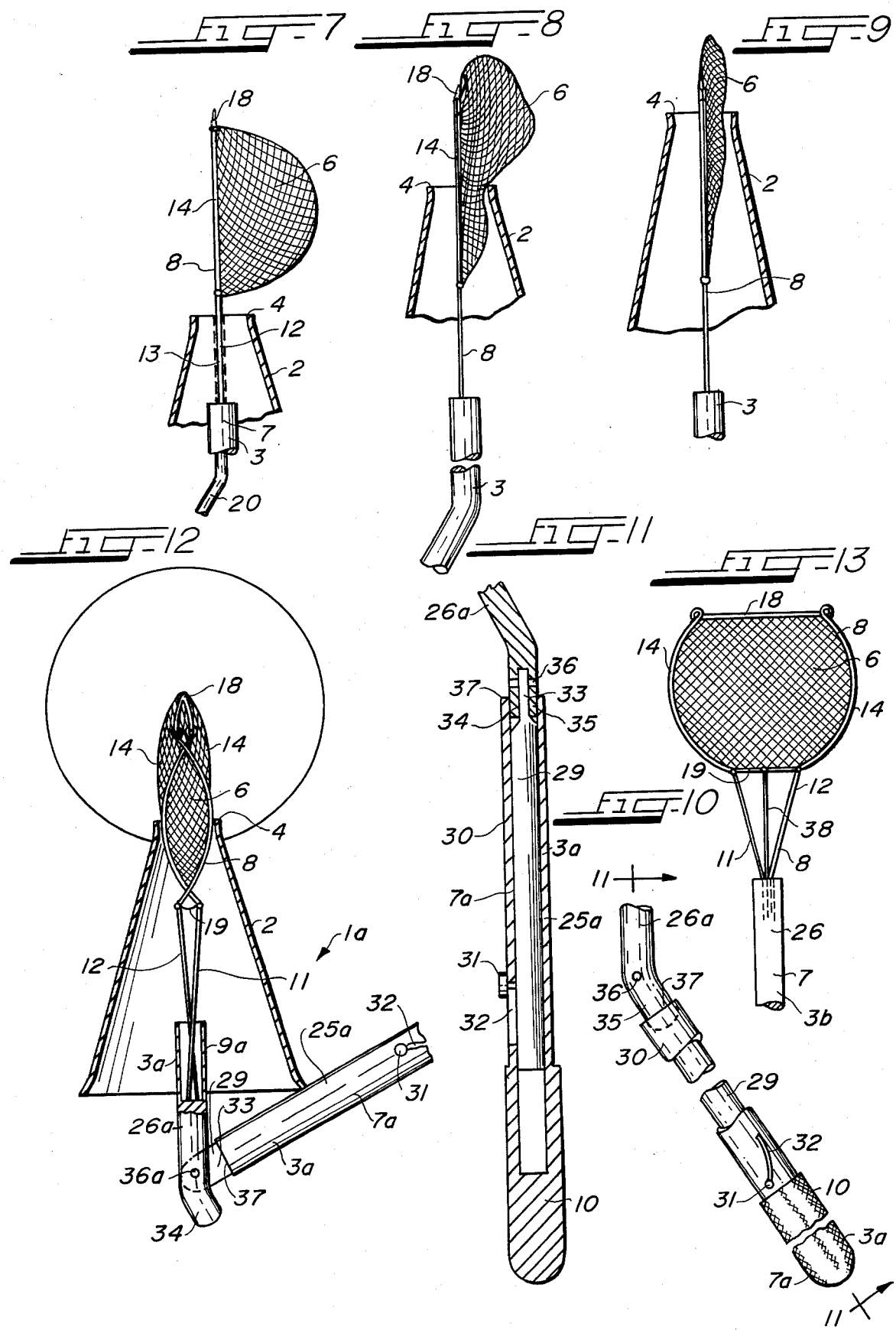

SURGICAL INSTRUMENTS

BACKGROUND OF THE INVENTION

This invention relates to surgical instruments, and, more particularly, to opthalmic surgical instruments for use in cataract extraction surgery.

It is a primary object of the present invention to afford a novel ophthalmic surgical instrument.

Another object of the present invention is to afford a novel ophthalmic surgical instrument for fragmenting lens material in an eye during cataract extraction surgery.

A further object of the present invention is to afford a novel ophthalmic surgical instrument for extracting lens material from an eye during cataract extraction surgery.

Two of the most commonly used forms of cataract therapy are the forms known to those skilled in the art as extracapsular cataract extraction and intracapsular cataract extraction.

In one of its forms, extracapsular cataract extraction, basically, has involved making a small incision in the eye, with the cataractous lens material being mechanically stirred or disorganized, and the lens material then being removed from the eye through the incision by aspiration or irrigation. One of the advantages of this procedure has been that a relatively small incision, such as, for example, an incision in the nature of 30° (3 to 5 millimeters) could be made, and, upon completion of the surgery, the incision could be closed by a minimum number of sutures —— often being closed by a single suture. One of the disadvantages of this procedure has been that, often times, cataractous substance is left behind so that poor visual results occurred.

In the surgical procedure known as intracapsular cataract extraction, a relatively large incision is made in the eye and the entire lens is removed intact. This incision commonly is in the nature of 170° (15 to 20 millimeters), which must be closed by multiple sutures, commonly in the nature of 6 to 10 such sutures. Using this method, it is not uncommon for it to take several weeks for the eye to heal.

During the past several years, with the advent of the operating microscope, renewed interest has been shown in the extracapsular extraction method. In fact, this remains the method of choice in most instances, in patients under the age of 20, since removal of the intact lens in these patients commonly results in the dangerous removal of the gel which fills the bulk of the eye behind the lens. This gel, which is known as the vitreous, tends to adhere to the posterior capsule of the lens in the early years of life. Therefore, intracapsular extraction in young individuals is highly dangerous. Furthermore, the cataractous lenses of the young patients are usually soft in texture and can be mechanically disrupted and then aspirated or irrigated from the eye with relative ease. Thus, by using the operating microscope, successful aspiration or irrigation of all of the lens material, with good visual results, is likely in such patients.

Unfortunately, in adults, the large nucleus of the lens becomes hard and is difficult to fragment for removal from the eye by aspiration or irrigation. In relatively recent years, surgical procedures which utilize ultrasonic vibrations to fragment the hard lens material have been used. However, such procedures have had several inherent disadvantages, such as, for example, requiring expensive equipment, costing several thousands of dollars; being difficult to use because of the danger of damaging adjacent portions of the eye; or being ineffective to properly fragment the nuclear material, and particularly, the harder nuclear material, and the like. It is an important object of the present invention to overcome such disadvantages.

Another object of the present invention is to afford a novel ophthalmic surgical instrument, which may be readily inserted into and extracted from the eye for capturing and fragmenting lens nuclear material.

An object ancillary to the foregoing is to afford such an instrument which is effective to properly fragment, for aspiration or irrigation purposes, even the hardest lens nuclear material.

Another object of the present invention is to afford such an instrument for fragmenting such nuclear material, which can be inserted into and withdrawn from an eye through the relatively small incision commonly used in extracapsular cataract surgery.

Yet another object of the present invention is to afford a novel ophthalmic surgical instrument for use in extracapsular cataract surgery, which is not only capable of properly fragmenting such nuclear material, but which is capable of extracting at least a portion of such material.

A further object of the present invention is to afford a novel ophthalmic surgical instrument for use in extracapsular cataract surgery, which is effective to properly fragment such nuclear material in a novel and expeditious manner.

Another object of the present invention is to afford a novel ophthalmic surgical instrument of the aforementioned type, which is practical and efficient in operation, and which may be readily and economically produced commercially.

Other and further objects of the present invention will be apparent from the following description and claims and are illustrated in the accompanying drawings which, by way of illustration, show preferred embodiments of the present invention and the principles thereof and what I now consider to be the best mode in which I have contemplated applying these principles. Other embodiments of the invention embodying the same or equivalent principles may be used and structural changes may be made as desired by those skilled in the art without departing from the present invention and the purview of the appended claims.

DESCRIPTION OF THE DRAWINGS

In the drawings:

FIG. 1 is an elevational view of an ophthalmic surgical instrument embodying the principles of the present invention, and, somewhat diagrammatically, showing the instrument inserted in an eye;

FIG. 2 is an exploded view of the instrument shown in FIG. 1, showing the parts thereof in disassembled relation to each other.

FIGS. 3, 4 and 5 are fragmentary views, similar to FIG. 1, but sequentially showing the positions of the parts of the instrument relative to each other in successive steps during the withdrawal of the instrument from an eye;

FIG. 6 is a view similar to FIGS. 3–5, but showing the parts of the instrument in a different position relative to each other, as they would appear during insertion of the instrument into the eye;

FIGS. 7, 8 and 9 are fragmentary, detail sectional views taken substantially along the lines 7—7, 8—8 and 9—9 in FIGS. 3, 4 and 5, respectively;

FIG. 10 is a fragmentary, detail elevational view, showing a modified form of the present invention;

FIG. 11 is a fragmentary, detail sectional view taken substantially along the line 11—11 in FIG. 10;

FIG. 12 is a fragmentary, detail sectional view, similar to FIG. 4 but showing the modified form of the invention shown in FIG. 10; and, FIG. 13 is a fragmentary, detail elevational view showing another modified form of the present invention.

DESCRIPTION OF THE EMBODIMENTS SHOWN HEREIN

An ophthalmic surgical instrument 1 for use in cataract extraction surgery, and embodying the principles of the present invention is shown in FIGS. 1–9 of the drawings to illustrate the presently preferred embodiment of the present invention.

The instrument 1 embodies, in general, a guide member or channel member in the form of a tube or sleeve 2 and an elongated probe 3, FIGS. 1 and 2. The sleeve 2 may be made of any suitable material, such as, for example, stainless steel, or the like, and preferably is substantially frusto-conical in shape, with the smaller end 4 and the larger end 5 thereof, both flaring radially outwardly, slightly, as shown in FIGS. 1 and 2.

The probe 3 embodies, in general, a container in the form of an open-topped net or bag 6 mounted on one end of an elongated handle 7 by means of a flexible frame 8. The container 6 and the frame 8 are movable between a substantially fully collapsed or contracted position, as shown in FIGS. 5 and 9, and a fully expanded position, as shown in FIGS. 1, 2 and 7, and are movable completely through the sleeve 2, into and out of the positions shown in FIGS. 1 and 2, for a purpose which will be discussed in greater detail presently.

The handle 7 may be made of any suitable material, such as, for example, stainless steel and preferably is solid throughout its length except for the end portion 9 which is disposed immediately adjacent to the container 6, and which is hollow or tubular in form, FIG. 2. Preferably, a hand grip or finger grip 10 is mounted on the end portion of the handle 7 remote from the end portion 9. The grip 10 may be made of any suitable material, such as, for example, rubber, or, if desired, may be afforded by knurling the end of the handle 7, or the like.

The frame 8 embodies two elongated members 11 and 12 which may be made of any suitable material, such as, for example, spring steel wire. Members 11 and 12 are identical in construction, except that they are mirror images of each other. Each embodies an elongated, substantially straight end portion 13, from one end of which projects a substantially arcuate-shaped end portion 14, FIGS. 1 and 2. Hooks or eyelets 15 are formed on the ends of the end portions 14 remote from respective end portions 13.

In the assembled probe 3, the end portions 13 of the members 11 and 12 are disposed in the tubular portion 9 of the handle 7, and project outwardly therefrom, the ends thereof remote from the end portions 14 being secured to the solid portion 17 of the handle 7, FIG. 2, by a suitable means, such as, for example, being imbedded therein and silver soldered thereto. The end portions 13 of the members 11 and 12 are secured to the handle 7, in spaced relation to each other, and, when the container 6 is in a fully expanded position, as shown in FIGS. 1 and 2, they flare outwardly away from each other between their interconnection to the handle 7 and their interconnection to the end portions 14.

Preferably, the container 6 of the probe 3 is made from a sheet of suitable netting material, such as, for example, a flexible wire mesh, or a flexible mesh made from a suitable plastic, such as, for example, nylon or dacron, or the like. The frame members 11 and 12 are secured to oppositely disposed outer peripheral edge portions of the container 6 by suitable means, such as, for example, threading them through the interstices in the netting. If desired, the container 6 may be further secured to the members 11 and 12 by wrapping the interengaging portions thereof with suitable filament, such as, for example, surgical suturing material, or the like, A supporting member 18 made of suitable material, such as, for example, the aforementioned surgical suturing material extends between and is secured to the eyelets 15 on the end portions 14 of the members 11 and 12. The supporting member 18 is threaded through the interstices in the adjacent peripheral edge portion of the container 6, between the eyelets 15, for supporting that portion of the container 6 when the latter is in the aforementioned fully expanded position. Another supporting member 19, like the supporting member 18, is woven or interlaced through the peripheral edge portion of the container 6 directly opposite the portion secured to the supporting member 18, and the end portions thereof are secured to the members 11 and 12 at the junction of the end portions 13 and 14 therewith, FIGS. 1 and 2. In addition to supporting the respective adjacent peripheral portions of the container 6, the supporting members 18 and 19 assist in restraining displacement of the peripheral edge of the container 6 along the end portions 14 of the members 11 and 12.

An elongated handle 20 in the form of a tubular member, extends along and is secured to the outer surface of the sleeve 2, FIG. 1. The handle 20 has one end 21 disposed in uniplanar relation to the end 4 of the sleeve 2, and has an end portion 22 which extends along the outer surface of sleeve 2 directly toward the other end 5 thereof. The handle 20 may be made of any suitable material, such as, for example, stainless steel, and the end portion 22 thereof is secured to and is interconnected to another end portion 23 which projects outwardly the outer surface of the sleeve 2 at an appropriate angle, such as, for example, 45° to the longitudinal axis of the sleeve 2, for facilitating the grasping thereof by a surgeon, for manipulating the sleeve 2 during a surgical operation as will be discussed in greater detail hereinafter. Also, the handle 20 affords a tubular member through which irrigation fluid may be fed into the eye of a patient, during such an operation, and a suitable coupling member 24 is secured to the free end of the end portion 23 for operatively connecting the handle 20 to a suitable source of such irrigation fluid, not shown.

So as to dispose the grip portion 10 of the probe 3 in the proper position for a surgeon to readily grasp the same during an operation, the end portion 25 of the handle 7, remote from the container 6 is disposed at a suitable angle, such as, for example, 45° to the other end portion 26 thereof, as viewed in FIGS. 1 and 2, the end portion 26 embodying the end portion 9 in which, it will be remembered, the members 11 and 12 of the frame 8 are mounted. In addition, preferably, the end portion 23 of the handle 20 and the end portion 25 of the handle 7 are disposed at a suitable acute angle, such as, for example, the aforementioned 45°, to the end portions 22 and 26 thereof, respectively, in a plane perpendicular to that in which they are shown in FIG. 1, as illustrated in FIGS. 7 and 8, respectively. With this construction, the end portions 23 and 25 of the handles 20 and 7, respectively, are so disposed that, when the opposite end portions 22 and 26 thereof, respectively, are positioned in or adjacent to a patient's eye during a surgical operation, the end portions 23 and 25 project horizontally outwardly away from alignment with the eye, and vertically upwardly away from the face of the patient, so that they may be readily grasped and manipulated by the surgeon.

In a typical surgical procedure, using the novel instrument 1, a small appropriate incision, such as, for example, a limbal corneal incision 27, preferably having a length of between 2 and 5 millimeters, may be made in the eye 28, as illustrated somewhat diagrammatically in FIGS. 1 and 3–6. During this procedure, of course, use is made of an operating microscope. After the aforementioned incision is made, and while maintaining maximum dilation of the pupil of the eye, a cystotome and scissors may be used for performing an anterior capsulectomy. Once the capsulectomy is completed, the cystotome or other suitable instrument, may be inserted into the lens and the lens nucleus with, perhaps, a portion of the cortex may be tumbled or prolapsed anteriorly into the anterior chamber.

Once the lens nucleus has been freed into the anterior chamber of the eye, the end 4 of the sleeve 2 may be inserted into the incision 27, this insertion preferably, being made only to such an extent that the anterior chamber is entered, as illustrated diagrammatically in FIG. 1. During this insertion of the sleeve 2 in the eye 28, the handle 20 may be used by the surgeon for manipulating the sleeve 2, the surgeon grasping the end portion 23 thereof, in his fingers. The coupling 24 is connected to a suitable source of irrigating fluid, not shown, which fluid may be fed through the handle 22 into the eye, thereby maintaining the proper shape of the anterior chamber thereof.

Thereafter, and with the smaller end 4 of the sleeve 2 being retained in position in the incision 27, the container 6 of the probe 3 may be advanced through the sleeve 2 into the eye 28. The larger end 5 of the sleeve 2 preferably, is slightly larger in diameter than the width of the container 6 between the oppositely disposed outer edges of the eyelets 15, when the container 6 is in fully expanded position, so as to facilitate the insertion of the probe 3 into the sleeve 2 by the surgeon, who, during this portion of the operation, grasps the grip 10 of the probe 3 in the fingers of one hand. The aforementioned outward flaring of the end 5 of the tube 2 assists in effecting ready insertion of the container 6 into the sleeve 2.

During advancement of the probe 3 through the sleeve 2 into the eye 28, the frusto-conical shape of the sleeve 2 causes the members 11 and 12 to be progressively flexed inwardly toward each other, until, when the probe 3 first enters the eye 28, the members 11 and 12 are disposed in crossed position relative to each other, as shown in FIG. 6. This inward flexing of the members 11 and 12 causes the frame 8 and the container 6 to be disposed in a collapsed or contracted position, in which it may pass through the incision 27 and the small end 4 of the sleeve 2 into the eye 28. During this movement of the probe 3, into the eye 28, the sheet material, which comprises the container 6, tends to trail behind the frame 8 as viewed in FIG. 6.

After the container 6 has passed completely through the sleeve 2, the resiliency of the frame 8 causes it to again be disposed in fully opened or fully expanded position within the eye 28, wherein the end portions 14 are disposed in concave-inwardly facing relation to each other, as illustrated in FIG. 1. The top opening into the container 6, when the latter is in a fully expanded position, is slightly greater in width than the nucleus of the lens of the eye 28, so that, when the container 6 is in expanded position within the eye 28, the surgeon, by manipulating the probe 3 may trap or capture the nucleus in the container 6.

With the nucleus of the lens thus captured within the container 6, the probe 3 may be slowly withdrawn through the sleeve 2. During such withdrawal of the probe 3, the container 6 and the frame 8 move from a position within the eye 28, as shown in FIG. 1, into a position wherein the frame 8 is engaged with the small end 4 of the sleeve 2, as shown in FIG. 3. This engagement of the frame 8 with the sleeve 2, and the continued outward movement of the probe 3 through the sleeve 2, causes the frame 8 and, therefore, the container 6 to be squeezed inwardly by the sleeve 2, and, therefore, to initiate compression of the frame 8 and container 6, as illustrated in FIG. 3, for withdrawal through the sleeve 2. The outward tapering of the small end 4 of the tube 2 assists in insuring sliding engagement between the inner surface of the sleeve 2 and the end portions 14 of the frame 8 during this initial withdrawal movement. Thereafter, continued outward movement of the probe 3 through the sleeve 8 causes the frame members 11 and 12 to be moved inwardly toward each other, into the aforementioned crossed, contracted position for movement of the frame 8 and container 6 progressively outwardly through the sleeve 2 as illustrated in FIGS. 4 and 5, into fully withdrawn position, such as that shown in FIG. 2.

It will be remembered that, prior to withdrawal of the probe 3 through the sleeve 2, the nucleus has been captured in the container 6. The nucleus is of substantially greater diameter than that of the small end 4 of the sleeve 2 and causes the sheet material of the container 6 to hang downwardly from the frame 8 as illustrated in FIG. 7, when the probe 3 is disposed in fully inserted position in the eye 28, as shown in FIG. 1. During withdrawal of the probe 3, through the sleeve 2, the nucleus (and any attached cortex material, or the like) disposed in the container 6 is tightly squeezed within the flexible sheet material of the container 6. In the aforementioned preferred form of the present invention, wherein the sheet material is in the form of netting, a major portion of the nucleus is caused to be squeezed outwardly through the openings in the netting and to fall into the anterior chamber of the eye during the passage of the container 6 outwardly through the small end 4 of the sleeve 2. This movement of the container 6, with the nucleus disposed therein, is somewhat diagrammatically illustrated in FIGS. 8 and 9 to show the substantial reduction in cross-sectional size of the container 6 and entrapped lens material during such outward movement of the probe 3 through the sleeve 2.

In the preferred form of the surgical instrument 1, wherein the sheet material of the container 6 is in the form of netting, the openings through the netting are of such small dimension that the lens material in the container 6 becomes pureed or lysed into small particles when it is squeezed therethrough, to thereby afford effective fragmenting of the lens material passing through the netting. After the probe 3 has been completely withdrawn from the eye 28 and the sleeve 2, a minor portion of the nuclear material, such as, for example, 25 to 30 percent thereof, will have been withdrawn in the container 6. The remainder, which it will be remembered is now in the form of small fragments within the eye 28, can then readily be removed by well-known irrigation and aspiration procedures. The remainder of the extraction procedure can be completed by continuous irrigation of the eye through a blunt needle inserted into the incision 27, to express the fragmented nuclear bits as well as the lens cortex from the eye in a manner well known to those skilled in the art. Thereafter, the incision 27, because of its small size, can be closed by a minimum number of sutures, one suture commonly being sufficient for this purpose.

Because of the relatively small size of the small end 4 of the sleeve 2, which it will be remembered is of such a size that it will readily enter an eye through an incision which, preferably, is only 2–5 millimeters in length, the compressive or squeezing force applied to the nuclear material within the container 6, during removal of the probe 3 from an eye, such as the eye 28, through the sleeve 2 is substantial. The construction of the instrument 1 lends itself to a substantial force being relatively readily applied by a surgeon to the probe 3 for withdrawing the same from the eye 28, the handle 20 affording an effective means by which the surgeon may hold the sleeve 2 in proper position in the incision 27 by one hand, and the end 5 of the sleeve 2 affording an effective abutment member against which the surgeon can press fingers of his other hand while he is withdrawing the probe 3 with the last mentioned hand.

Because of the relatively high compressive or squeezing forces, which can thus be applied to nuclear material with the novel instrument 1, it affords an effective instrument for fragmenting all types of nuclei, including those which invoive as a large portion of their mass the extremely hard or leathery, and difficult to fragment material commonly found in the eyes of adults.

In FIGS. 10–12, a modified form of the present invention is shown, and parts which are the same as parts shown in FIGS. 1–9 are indicated by the same reference numerals, and parts which are similar to but different from the parts shown in FIGS. 1–9 are indicated by the same reference numerals with the suffix *a* added thereto.

The instrument 1a, shown in FIGS. 10–12, is identical in construction to the instrument 1, shown in FIGS. 1–9, except for the handle 7a of the probe 3a. In the handle 7a, the end portion 25a thereof embodies an elongated rod 29, which is slidably mounted within an elongated sleeve or tubular member 30 for longitudinal adjustment relative thereto. An abutment member in the form of a set screw 31 is threaded into the rod 29 and extends outwardly through an elongated slot 32 formed in and extending longitudinally along the sleeve 30, FIGS. 10 and 11. When the set screw 31 is screwed into the rod 29 into position to clampingly engage the sleeve 30, the rod 29 and sleeve 30 are effectively secured against movement relative to each other. On the other hand, by loosening the screw 31 from its clamping engagement with the sleeve 30, the rod 29 and the sleeve 30 may be freed for longitudinal movement relative to each other for a purpose which will be discussed in greater detail presently.

The rod 29 has an ear 33 formed on the end thereof remote from the grip 10 of the handle 7a, the ear 33 projecting outwardly from the sleeve 30 in all positions of the rod 29 therein.

The end portion 26a of the handle 7a is identical in construction to the end portion 26 of the handle 7, except that it has two parallel, spaced ears 34 and 35 projecting from the end thereof remote from the container 6, FIG. 11. The ear 33 of the end portion 25a is disposed between the ears 34 and 35 and is pivotally secured thereto by suitable means, such as a pin 36, for pivotal movement of the end portions 25a and 26a relative to each other around the axis of the pin 36, for a purpose which will be discussed in greater detail hereinafter.

When the set screw 31 is loosened, the sleeve 30 may be moved along the rod 29 toward and away from the container 6, the set screw 31 passing along through the slot 32. The ears 34 and 35 are of such size, and project from the pin 36 a sufficient distance, that when the sleeve 30 is disposed in its closest operative position relative to the container 6, the end portion 37 thereof, remote from the grip 10, is disposed in closely overlying relation to the free-end portions of the ears 34 and 35, FIGS. 10–11, in position to firmly secure the end portions 25a and 26a of the handle 7a in stationary position relative to each other. With the end portions 25a and 26a thus stationarily secured relative to each other, the probe 3a may be used in the same manner as herefor described with respect to the probe 3.

However, in addition, if desired, during a cataract extraction operation, the set screw 31 may be loosened and the sleeve 30 moved outwardly away from the container 6, into position spaced from the ears 34 and 35, to thereby free the ears 34 and 35 for pivotal movement relative to the ear 33, and the set screw 31 may again be tightened to hold the sleeve 30 in such position.

With the sleeve 30 disposed in the last mentioned operative position, the end portion 25 of the handle 7a is free to pivot around the pin 36 relative to the end portion 26a. The end portions 25a and 26a are so disposed relative to each other, that, during withdrawal of the container 6 through the small end 4 of the tubular member 2, the end portion 25a may be swung into position wherein it abuttingly engages the end 5 of the tubular member 2 between the grip 10 and the pin 36a, as shown in FIG. 12. In such position, the end portion 25a affords a lever member which is effective upon further rotation relative to the end portion 26a in a counterclockwise direction, as viewed in FIG. 12, to augment the withdrawal force applied to the container 6 by a surgeon.

In FIG. 13 another modified form of the present invention is shown. The form of the invention shown in FIG. 13 is identical in construction to that shown in FIGS. 1–9, except that the probe 3b, shown in FIG. 13, embodies an elongated restraining member 38 secured at one end to the central portion of the restraining member 19 and at the other end to the end portion 26 of the handle 7. The restraining member 38 may be made of any suitable material, such as, for example, stainless steel wire, and may be secured to the longitudinal central portion of the restraining member 19 in any suitable manner, such as, for example, having the central portion of the restraining member 38 looped over the restraining member 19, with the other end portions of the member 38 mounted in and secured to the handle 7 by silver solder, or the like, in the same manner as heretofor discussed with respect to the members 11 and 12.

The restraining member 38 is operable to effectively secure the container 6 against sliding along the end portions 14 of the frame members 11 and 12, particularly during withdrawal of the probe 3b through the sleeve 2 from an eye, such as the eye 28, illustrated in FIGS. 1–9.

From the foregoing, it will be seen that the present invention affords a novel ophthalmic surgical instrument.

In addition, it will be seen that the present invention affords a novel instrument for fragmenting, in a novel and expeditious manner, lens material during cataract extraction surgical procedures.

Also, it will be seen that the present invention affords a novel ophthalmic surgical instrument for removing lens material from an eye during cataract extraction surgery.

In addition, it will be seen that the present invention affords a novel ophthalmic surgical instrument which is practical and efficient in operation, and which may be readily and economically produced commercially.

Thus, while I have illustrated and described the preferred embodiments of my invention, it is to be understood that these are capable of variation and modification, and I, therefore, do not wish to be limited to the precise details set forth but desire to avail myself of such changes and alterations as fall within the purview of the following claims.

I claim:

1. An ophthalmic surgical instrument for use in cataract extraction surgery wherein lens material is removed from an eye through an incision therein, said instrument comprising
   a. an elongated sleeve adapted to be inserted into such an incision,
   b. means
      1. adapted to be inserted through said sleeve into position to encompass such lens material in such an eye when said sleeve is so inserted into said incision, and
      2. adapted to be moved outwardly through said sleeve from said eye and adapted to thereby change the form of said lens material encompassed therein to a form which can pass through said incision, and
   c. means for moving said first mentioned means through said sleeve into and out of eye when said sleeve is so disposed in said incision.

2. An ophthalmic surgical instrument as defined in claim 1, and in which
   a. said first mentioned means includes a substantially uniplanar frame
      1. having an expanded position and a contracted position, and
      2. adapted to be moved through said sleeve in said contracted position.

3. An ophthalmic surgical instrument as defined in claim 1, and in which
   a. said first mentioned means comprises a container adapted to be moved between
      1. an expanded position in which to encompass said material and
      2. a contracted position in which to pass through said sleeve.

4. An ophthalmic surgical instrument as defined in claim 3, and in which
   a. said container comprises
      1. a frame, and
      2. a sheet of flexible material secured to said frame, and
   b. said frame is adapted to be moved between
      1. an expanded position wherein it is effective to hold the edge portion of said sheet in position wherein said sheet is supported from said frame in the form of an open-topped container, and
      2. a contracted position wherein it is effective to substantially close the top of said last mentioned container.

5. An ophthalmic surgical instrument as defined in claim 4, and in which
   a. said sheet comprises netting.

6. An ophthalmic surgical instrument as defined in claim 5, and which includes
   a. means connected between said means for moving and said netting for securing said netting against movement on said frame away from said means for moving.

7. An ophthalmic surgical instrument as defined in claim 1, in which
   a. said first mentioned means comprises a net,
   b. said net comprises
      1. a flexible frame, and
      2. a sheet of netting having its outer edge portions secured to said frame,
   c. said frame being adapted to be moved between
      1. a contracted position wherein it is effective to close said net for passage through said sleeve into and out of such an eye, and
      2. an expanded position wherein it is effective to open said net for encompassing said lens material therein.

8. An ophthalmic surgical instrument as defined in claim 7, and in which
   a. said second mentioned means comprises an elongated handle,
   b. said frame comprises two elongated flexible members
      1. secured at one end to one end of said handle, and
      2. having other end portions movable toward and away from each other, and
   c. said netting is secured to said other end portions.

9. An ophthalmic surgical instrument as defined in claim 8 and in which
   a. said other end portions
      1. are arcuate in shape, and
      2. are adapted to be moved between
         a. one position wherein they are disposed in concave-inwardly facing relation to each other, and
         b. another position wherein they are disposed in crossed relation to each other.

10. An ophthalmic surgical instrument as defined in claim 8, and in which
   a. said handle includes
      1. another end portion pivotally connected to said one end of said handle for movement between
         a. one position wherein the included angle between said end portions of said handle is less than 180°, and
         b. another position for abuttingly engaging said sleeve and wherein the included angle between said end portions of said handle is less than said first mentioned included angle, and
      2. means for releasably securing said other end portion of said handle in said one position.

11. An ophthalmic surgical instrument as defined in claim 10, and in which
   a. said one end portion of said handle includes two ears projecting from the end thereof remote from said netting,
   b. said other end portion of said handle comprises
      1. a rod having an ear disposed between and pivotally connected to said two ears,
      2. a sleeve slidably mounted on said rod and adapted to be moved when said end portions of said handle are disposed in said one position, between
         a. one position for enclosing said two ears and holding said end portions of said handle in said one position thereof, and
         b. another position spaced from said two ears for freeing said end portions of said handle for movement into said other position thereof, and
      3. means for releasably securing said sleeve in said one position thereof.

12. An instrument for use in extracapsular cataract surgery wherein lens material is removed from an eye through an incision therein, said instrument comprising
   a. elongated tubular guide means having an end portion adapted to be inserted into such an incision,
   b. means adapted to be moved axially through said guide means into said eye for surrounding and capturing therewithin said lens material,
   c. said second mentioned means being adapted to fragment said lens material after said material is captured thereby, and
   d. said second mentioned means being adapted to be moved axially through said guide means for removing at least a portion of said material outwardly through said incision.

13. An ophthalmic surgical instrument for use in cataract extraction surgery wherein lens material is removed from an eye through an incision therein, said instrument comprising
   a. elongated tubular guide means adapted to be inserted into such an incision, and
   b. means adapted to be moved axially through said first mentioned means into and out of said eye for capturing within said second mentioned means and removing such lens material through said guide means and said incision.

14. An ophthalmic surgical instrument as defined in claim 13, and in which
   a. said second mentioned means is
      1. adapted to be moved through said guide means into position in said eye to capture and fragment said lens material, when said guide means is so inserted in said incision, and
      2. adapted to be moved outwardly through said guide means from said eye to thereby remove portions, at least, of such captured lens material outwardly through said incision.

15. An ophthalmic surgical instrument for use in cataract surgery wherein a lens nucleus is freed into the anterior chamber of an eye and then removed through an incision in the eye, which incision is not of substantially greater length than 5 millimeters, said instrument comprising
   a. a sleeve adapted to be inserted into such an incision,
   b. means for fragmenting said lens nucleus within said chamber,
   c. said means comprising a member having a collapsed and expanded position
   d. said member being adapted to be
      1. moved through said sleeve in said collapsed position,
      2. expanded in said eye for capturing said lens nucleus therein, and
      3. collapsed in said chamber for fragmenting said lens nucleus and moving outwardly through said sleeve from said chamber.

16. An instrument as defined in claim 15, and in which
   a. said member comprises
      1. a bag comprising
         a. a body portion having
            1'. an open top, and
            2'. a closed bottom
         2. a frame extending around and secured to said top, and
   b. said frame being adapted to be collapsed and expanded upon movement thereof into and out of said sleeve, respectively, to thereby close and open said top.

17. An instrument as defined in claim 16, and in which
   a. said frame comprises two flexible wire members secured to said handle and adapted to be moved toward and away from each other.

18. An instrument as defined in claim 16, and in which
   a. said body portion comprises a sheet of flexible netting.

19. An instrument as defined in claim 16, and which includes
   a. means on said sleeve and adapted to be inserted therewith into said incision for irrigating said chamber.

20. An instrument as defined in claim 19, and in which
   a. said last mentioned means comprises an elongated tubular member mounted on and extending along the outer surface of said sleeve, and
   b. said tubular member has an end portion projecting outwardly from said sleeve to afford a handle for manually supporting said sleeve.

21. An ophthalmic surgical instrument for use in extracapsular cataract extraction surgery wherein lens material is removed from an eye through an incision therein, said instrument comprising
   a. a substantially frusto-conical shaped sleeve having
      1. a small end portion, and
      2. a large end portion, b. said sleeve being adapted to be inserted into such an incision with said small end portion disposed in such an incision and said large end portion projecting outwardly from such an eye, and
c. an elongated probe
   1. adapted to be moved through said sleeve into position to capture such a nucleus in said eye when said sleeve is so inserted in said incision, and
   2. adapted to be moved outwardly through said sleeve from said eye when said sleeve is so inserted in said incision,
d. said probe comprising
   1. an elongated handle,
   2. a flexible frame mounted on and projecting from one end of said handle, and
   3. a flexible container mounted on and carried by said frame,
e. said frame and container being adapted to be moved into
   1. an expanded position for so capturing said nucleus, and
   2. a contracted position for passage through said small end portion and for fragmenting said captured nucleus,
f. said frame comprising two elongated, flexible, resilient wire members having
   1. substantially straight end portions secured at one end to one of said handle in spaced relation to each other, and
   2. substantially arcuate-shaped other end portions projecting from the end of said first mentioned end portions remote from said handle,
g. said container comprising a sheet of netting having oppositely disposed, outer peripheral edge portions thereof secured to said other end portions,
h. said wire members, when said frame and container are disposed in said expanded position, being so disposed that
   1. said first mentioned end portions flare outwardly away from each other from said handle to said other end portions, and
   2. said otherend portions are disposed in spaced, concave-inwardly facing relation to each other to thereby support said netting in position to afford an open-top container, and
i. said wire members, when said frame and container are disposed in said contracted position, being so disposed that
   1. they cross each other in one direction and back in the other direction, and
   2. said other end portions are disposed in closer relation to each other than when said frame and container are disposed in said expanded position, to thereby close the top of said container.

* * * * *